April 7, 1970          J. LOGRIPPO          3,505,154
BRAIDED RUG
Filed Sept. 22, 1965          2 Sheets-Sheet 1
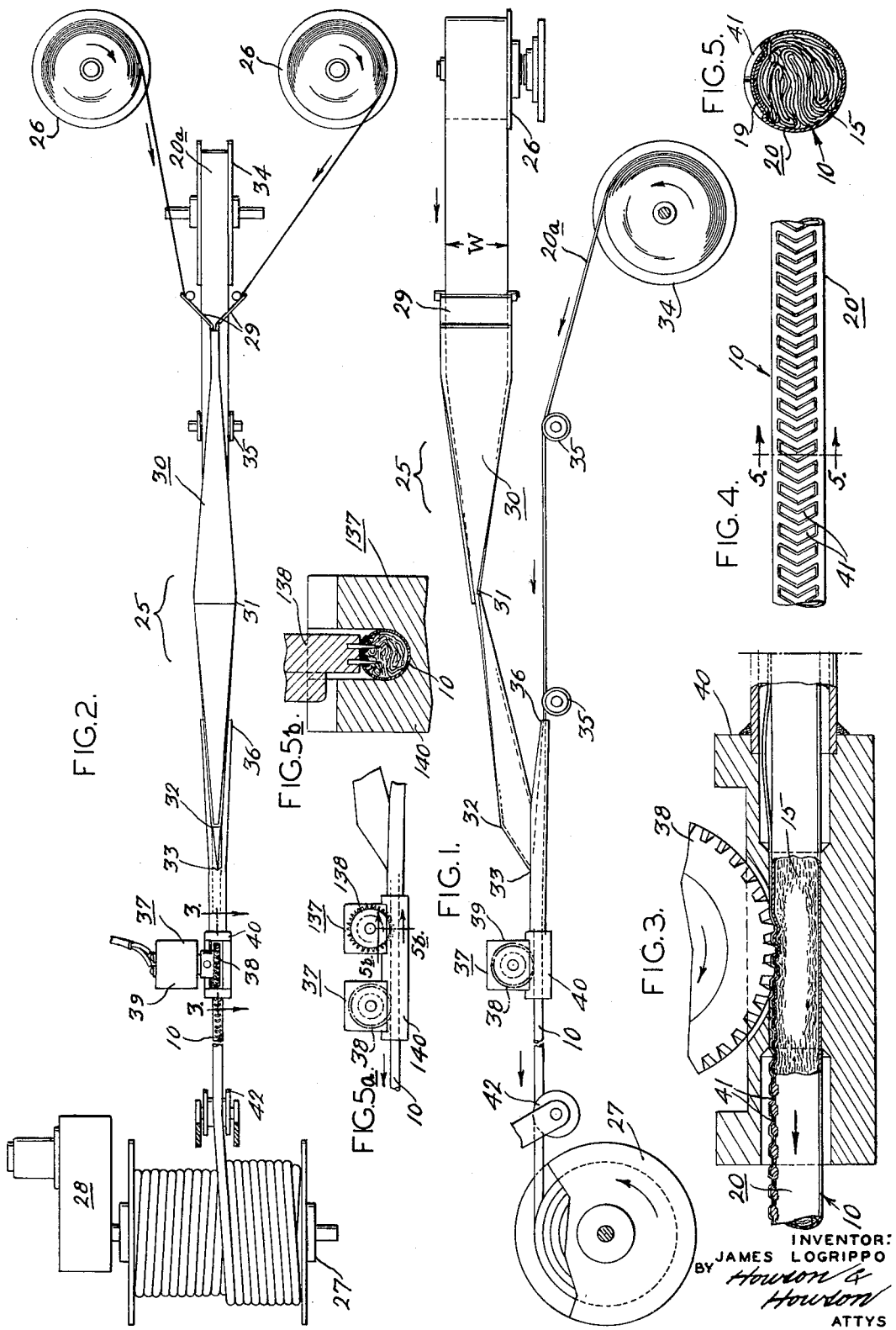
INVENTOR:
JAMES LOGRIPPO
BY Howson & Howson
ATTYS April 7, 1970  J. LOGRIPPO  3,505,154
BRAIDED RUG Filed Sept. 22, 1965  2 Sheets-Sheet 2

INVENTOR:
JAMES LOGRIPPO
BY Howson & Howson
ATTYS.

United States Patent Office 3,505,154
Patented Apr. 7, 1970

3,505,154
BRAIDED RUG
James Logrippo, Norristown, Pa., assignor to Norristown Rug Manufacturing Company, Norristown, Pa., a partnership
Filed Sept. 22, 1965, Ser. No. 489,338
Int. Cl. D04h 3/02
U.S. Cl. 161—35  5 Claims

ABSTRACT OF THE DISCLOSURE

This patent discloses a sheathed core element in which a resilient core is composed of an axially extending piece of thin flexible material which extends substantially the entire length of the core element, the flexible material being folded a plurality of times upon itself so as to form a substantially cylindrical and flexible core element. Circumscribing the core is a sheet of substantially waterproof material such as a plastic, the material having overlapping portions which preferably contain a heat seal to connect the overlapping portions together thereby forming a substantially waterproof element. The element preferably has a braided decorative outer cover so that when the covered element is juxtapositioned it forms adjacent lays which are connected together to form a braided rug. This patent also discloses the method of forming the sheathed core element and making a rug of the element either with or without a braided covering.

The present invention relates to sheathed core elements or strands particularly for utilization in rugs or the like. More particularly the present invention relates to a novel sheathed or encased core element which may be used with or without an outer decorative covering in a rug, and the method and apparatus for producing the encased elements.

Typically braided rugs that are commercially manufactured either abroad or in the United States comprise a filler having an outer decorative covering, the covering usually comprising a braid of cotton, wool, nylon or vinyl. In most instances, except in extremely expensive braided rugs, the filler material is composed of waste cotton, wool, etc. which may not be particularly clean and therefore many times emits an unpleasant odor. The unpleasant odor is amplified many times upon the rug becoming wet, and due to the thickness of the rug, the drying out process may take five or six days in the open air and hot sun to reduce the odor to its prior level. In addition, due to the type of scrap used in the filler, mildew and rot may occur which, of course, causes an additional unpleasant odor, sometimes necessitating discarding the rug.

In addition, any slight defect in the decorative cover of a braided rug will expose the filler, and as the rugs are normally of a bright and fanciful color, the exposed portion of the filler appears as a glaring defect.

Accordingly, it is a principal object of the present invention to provide a casing or sheathe circumscribing a core of scrap material wherein the strand thus produced may be used as a filler for braided rugs, or may be used by itself to form, for example, a rug, carpet, or mat.

Another object of the present invention is to provide a novel strand as hereinabove described having a casing which inhibits water or moisture entering into the core thereof in order to eliminate and substantially reduce the odor emanating from a rug in the event the rug is inadvertently wetted.

Another object of the present invention is to provide a substantially waterproof encased core element or strand which may be composed of a plastic material of different colors and used as a filler in a rug whereby a defect in the outer braid will be inconspicious except upon close inspection, thereby reducing the number of seconds or rugs which must be destroyed due to unsightly appearance.

Yet another object of the present invention is to provide a strand comprising a plastic casing circumscribing a resilient core, which casing has an overlapping portion which enables convenient sealing of the casing axially of the strand.

And still another object of the present invention is to provide a rug comprising a strand including a thermoplastic casing circumscribing a resilient core, which casing has an overlapping portion which enables convenient heat sealing thereof axially of the strand, and thereafter enabling connection of juxtapositioned strand or strands to form a rug or carpet.

Still another object of the present invention is to provide a novel method of forming a substantially waterproof strand by forming a core of resilient material into cylindrical shape, simultaneously feeding said core and a narrow sheet of waterproof material to a junction point, wrapping the core with the waterproof material at the junction point and then sealing the sheet to form a substantially waterproof casing circumscribing the core.

Still another object of the present invention is to provide novel apparatus for forming a substantially waterproof strand wherein the core material is initially relatively wide sheets of a resilient material, and including means for receiving the sheets in a folding chute which is operable to fold the sheets into a substantially ovoid or cylindrical core. The novel apparatus includes means to feed a separate narrow sheet of waterproof material coextensively with the core sheets but externally of the folding chute and means at the outlet of the chute to join the narrow sheet with the cylindrical core whereby the narrow sheet circumscribes the core and overlaps the same. In addition, after the sheathe has been joined in circumferentially overlapping relation with the core, sealing means are provided to seal the sheathe or casing.

Other objects and a fuller understanding of the invention may be had by referring to the following specification and claims taken in conjunction with the accompanying drawings in which:

FIG. 1 is a fragmentary profile and schematic view of apparatus of the present invention adapted to manufacture a novel strand constructed in accordance with the present invention;

FIG. 2 is a plan view of the apparatus illustrated in FIG. 1;

FIG. 3 is an enlarged fragmentary sectional view taken along line 3—3 of FIG. 2;

FIG. 4 is a plan view of a portion of the strand illustrated in FIG. 3;

FIG. 5 is an enlarged sectional view taken along line 5—5 of FIG. 4;

FIG. 5a is a fragmentary profile view of a different form of sealing mechanism than that shown in FIGS. 1, 2, and 3;

FIG. 5b is an enlarged sectional view taken along line 5b—5b of FIG. 5a;

Figure 6:
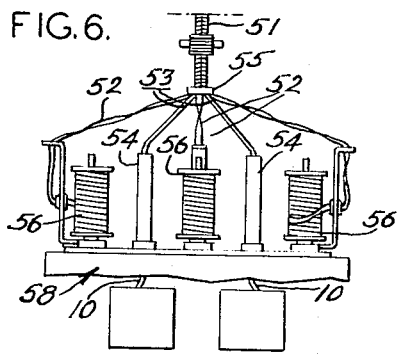
FIG. 6 is a schematic profile view of a conventional braiding machine utilizing the novel strand as a filler for a braided rug.

Referring now to the drawings, and especially FIGS. 4 and 5 thereof, a novel strand 10 constructed in accordance with the present invention is illustrated therein. As shown in FIGS. 4 and 5, the strand 10 is cylindrical in cross section and comprises a core 15 having a casing or sheathe 20, preferably composed of a water resistant material such as plastic, and more particularly a thermoplastic such as polyvinyl chloride.

Although the core may be composed of any resilient material such as waste cotton, wool, etc. it has been found that an all cellulose core, or a combination of cellulose and a nonwoven fabric, or an all nonwoven fabric such as produced by Johnson & Johnson, provides an excellent resilient and inexpensive core. Material such as cellulose may be provided in sheet form in any convenient width and then must be folded in such a manner as to provide a cylindrical mass about which the casing or sheathe 20 may be applied. To this end, and is accordance with one feature of the invention, novel apparatus for folding and simultaneously feeding a core of resilient material and a narrow sheet of waterproof material towards a junction point, and forming the core into a cylindrical shape and wrapping it with the sheet of waterproof material and sealing it, is illustrated in FIGS. 1 and 2.

As illustrated in FIGS. 1 and 2, apparatus 25 for forming a strand 10, such as heretofore described, comprises sheet supply means, in the present instance including supply reels or rotatable drums 26 mounted at one end of the apparatus and a take-up reel 27 for winding the finished strands 10 thereon, mounted at the other end. In order to insure constant velocity take-up as well as insuring an even tension on the strand 10 as it moves through the apparatus 25, a reeves type drive 28 is connected to the reel 27 for imparting rotation thereto. As illustrated in the drawings the apparatus 25 includes guide means 29 for permitting entry of the core material into a folding chute 30. In the present instance, the folding chute 30 has three fold points a first fold point 31, a second fold point 32, and a junction or master fold point 33. Thus for example, if the supply reels 26 contain sheet cellulose having a width (W) of approximately 6 inches, three folds will reduce the material to a substantially cylindrical or ovoid mass. Of course additional folds may be required with different width sheets but a 6 inch width has been found to work well when utilizing three fold points.

As best shown in FIG. 2, a reel 34 containing casing or sheathe material 20a which is substantially waterproof, such as a plastic, and preferably a thermoplastic material, is mounted thereon. As illustrated the sheathe material passes over rollers 35 into a conical chute 36 forming an extension of the master fold 33. As illustrated, the passage of the sheathe material to the junction point is exterior of the folding chute 30 and coextensive therewith, in the present instance underlying the chute, and joining and circumscribing, at the third or master fold 33, the already folded core material.

In order to seal the casing or sheathe material 20a so that is forms a casing about the core 15, when utilizing a thermoplastic material such as polyvinyl chloride, means are provided to seal the casing 20 so as to form the finished strand 10. To this end, spaced from the junction point or master folder 33, in the direction of travel of the strand 10, is rotatable sealing means 37 containing a heating element for conductively heating and sealing, axially of the strand, the overlapping portion 19 of the casing or sheathe 20. The rotatable sealing means may comprise a gear wheel 38 rotatably mounted in a block 39 and movable due to the frictional engagement between it and the strand 10 as the strand is wound on the take-up reel 27. As illustrated in FIGS. 3 and 4, the gear wheel is preferably positioned in a shoe type guide 40 which maintains the strand in alignment beneath the gear wheel 38 as it passes therethrough. In addition, it was found that if the gear wheel had the peripheral form of a herringbone, and if the strand were to be used as a filler for a braided rug, the seal 41 having a herringbone design (see FIG. 4) makes it more difficult to detect in the event of defects in the covering braid. The reason for this is that the braid formed on a braiding machine and circumscribing the filler usually has an angle similar to the herringbone tooth angle. As illustrated in FIGS. 1 and 2, forward of the sealing means 37 is a roller guide 42 which effectuates the winding of the strand on the take-up reel 27.

As a typical example of the strand produced, one of the supply reels 26 may contain sheet cellulose having a width of approximately 6 inches while the other reel contains a nonwoven fabric having a width of approximately 6 inches. Assuming that the casing material 20a is a thermoplastic material, such as polyvinyl chloride having a width of approximately 2 inches, and is being pulled through the third master folder 33 or junction point and thus the rotatable sealing means 37 of a linear velocity at 150 feet per minute, a thermostat reading of the heating element (not shown) in the gear wheel of approximately 700° F. will effectuate a seal of the casing or sheathe 20 in the overlapping portion 19.

Of course additional sealing means may be utilized in series to increase the effectiveness of the seal if higher velocities are desirable or the casing or sheathe material 20a is particularly thick, one such embodiment being illustrated in FIGS. 5a and 5b wherein a rotatable sealing means 137 is placed in series with the rotatable sealing means 37. As illustrated in FIGS. 5a and 5b a first rotatable wheel 138 may contain a plurality of axially offset and circumferentially spaced pins, much in the form of needles, which are heated by a heating element, and which means acts as a first sealer upon the strand 10 as it is being pulled through a double guide shoe 140. If a pin wheel 138 as above described is utilized, in order to insure the relative watertight integrity of the strand 10, it is preferable that in subsequent treatment, for example that received in an all polyvinyl chloride type rug, that the pin holes be sealed as by an electronic weld or other means which cause the material to flow together and seal.

The strand 10 may be used in the form as wound on the take-up reel 27 to make such things as a mat, oval or rectangular rug, or it may be used as a filler for a conventional braided rug.

Figure 7:
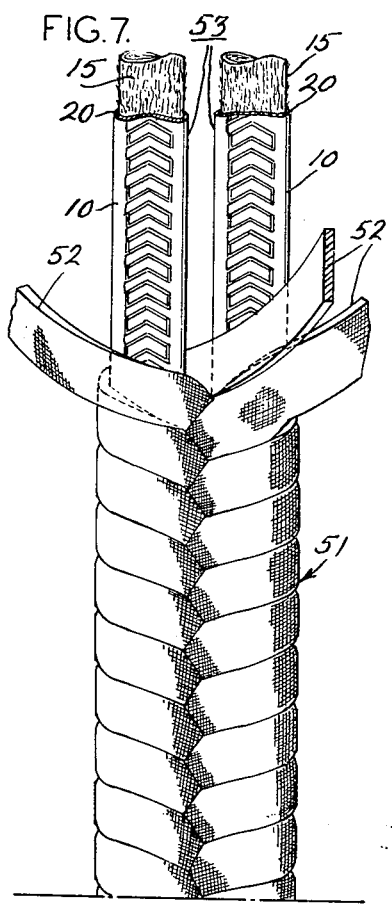
FIG. 7 is an enlarged fragmentary view of a braid made on the machine illustrated in FIG. 6.
Figure 13:
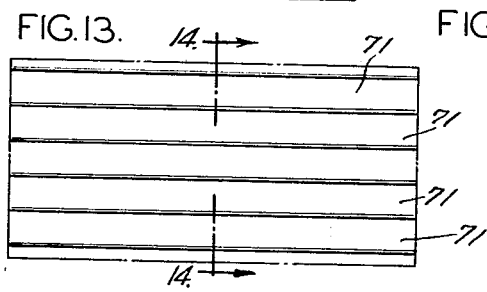
FIG. 13 is an enlarged plan view of a portion of the rug illustrated in FIG. 12.
Figure 8:
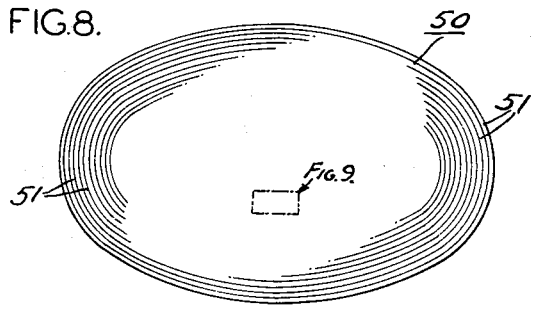
FIG. 8 is a schematic view of an oval braided rug utilizing the braid illustrated in FIG. 7.
Figure 9:
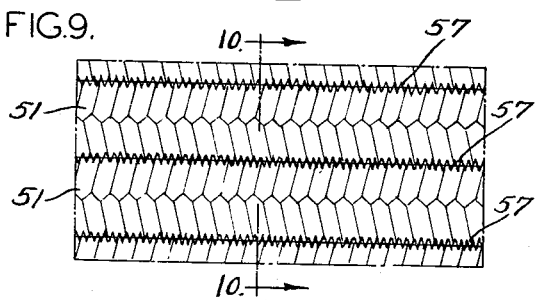
FIG. 9 is an enlarged plan view of a portion of the braided rug illustrated in FIG. 8.
Figure 10:
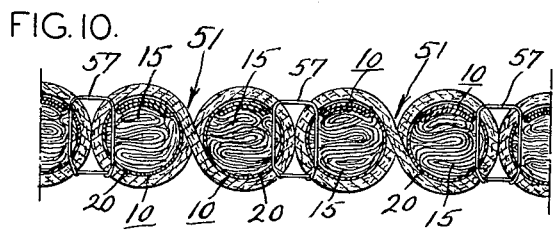
FIG. 10 is an enlarged sectional view taken along line 10—10 of FIG. 9.
Figure 11:
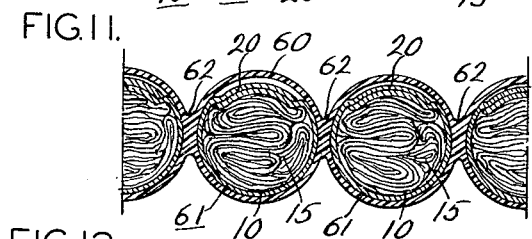
FIG. 11 is an enlarged sectional view of a portion of a braided rug utilizing the strand of the present invention as a filler but having a thermoplastic braided covering in which adjacent lays have been electronically welded to each other.

FIGS. 6–10 illustrate the use of the strand 10 as a filler and the method of manufacture of the strand in an oval type braided rug 50 (see FIG. 8). Of course, although the description of the rug 50 as set forth hereinafter utilizes a figure eight braid, a single braid having a filler comprising the strand 10 such as hereinabove described, is equally applicable in forming braided rugs.

Referring now to FIG. 7, a figure eight braid 51 having an outer decorative portion comprises, in the present instance fabric strips 52 and a filler 53 including a pair of strands 10. It should be recognized that the outer braid may be composed of any conventional and well-known material such as knitted cord, yarn, etc. In the present instance the braid 51 is formed on a braiding machine such as the five strand braiding machine 58 illustrated in FIG. 6.

As shown in FIG. 6, the strands 10 comprising the filler 53 are fed through filler guide means 54 to a braiding guide 55 while a plurality of bobbins 56 carrying the strips 52 thereon travel in a figure eight path thus forming a braid such as the one illustrated in FIG. 7. Thereafter, in a manner well-known in the art, the continuous length braid 51 is positioned to form adjacent juxtapositioned lays (see FIGS. 9 and 10) and stitched together in a progressive manner as at 57 to form a finished rug 50.

Of course other braiding machine types may be used such as the tubular or round braiding machine, or other machines using wrap-around techniques, and in that instance the braid includes a filler composed of a single strand 10. For example, the single or round braiding machines are particularly popular in Japan.

The strand 10 may also be used as a filler in a thermoplastic type rug having an outer decorative cover or braid 60 of plastic, such as polyvinyl chloride plastic strips. In much the same manner as above described with reference to the braided rug 50, the braid 60 includes a filler 61 composed of strands 10 manufactured as heretofore described. Because of the type of treatment utilized in a rug having a plastic outer decorative covering or braid 60, the heated pin wheel technique illustrated in FIGS. 5a and 5b, and above described, may be utilized.

As set forth in the Logrippo Patent No. 3,054,707, a rug comprising, for example, polyvinyl chloride braids 60 is first preheated and then placed into a high frequency oven which causes softening of the vinyl strips. This treatment causes a limited cohesion of the braid. Upon passing out of the oven the rug is subjected to momentary pressure by a press which seals the individual braids 60 to each other as at 62. In addition, the pressure of the press serves to additionally seal the casing or sheathe 20 of the strands 10 which form the filler 61.

When utilizing filler 53 composed of the strands 10 in a rug 50 such as above described, the casing 20 serves to inhibit the entrance of moisture or the like into the core 15. In addition, both in the rug having strips 52 forming a braid 51 and in the rug having an outer braid 60, if the casing or sheathe 20 of the strand or strands provided has a color that is the predominant color in the rug, slight imperfections such as openings in the braid exposing the filler will not be noticeable, except upon very close scrutiny.

Figure 12:
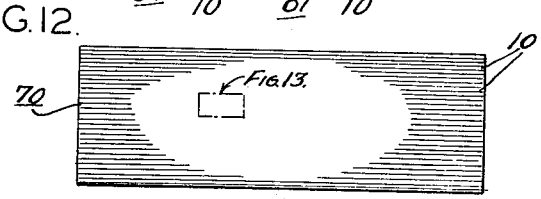
FIG. 12 is a schematic plan view of a rectangular mat or rug composed of strands of the invention.
Figure 14:
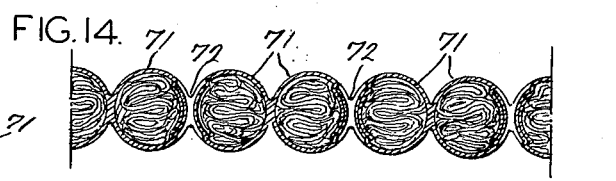
FIG. 14 is an enlarged sectional view taken along line 14—14 of FIG. 13.

The strand 10 may also be used by itself to form an inexpensive mat or rug having either a rectangular or oval form. Such an embodiment is illustrated in FIG. 12 wherein a rectangular rug 70 comprises a plurality of strands 10 which form adjacent and juxtapositioned lays 71 having connecting means for joining the adjacent lays to each other. For example, as illustrated in FIG. 14, the connecting means may comprise an electronic weld 72 as has heretofore been described relative to the Logrippo Patent No. 3,054,707.

Thus a novel strand manufactured in accordance with the method of the present invention on novel apparatus is provided, which strand may be used as a filler for a rug of the braided type or by itself to form an inexpensive and yet durable, substantially waterproof mat or rug.

What is claimed is:

1. A rug comprising at least one axially extending, substantially cylindrical strand juxtapositioned to form adjacent lays, said lays being connected together to form a rug, said lays including at least one sheathed core element and having a braided decorative covering therearound; said decorative covering of each lay connected to the decorative covering of at least one adjacent lay to form said rug, said core including at least one axially extending piece of thin flexible material being folded a plurality of times to form a substantially cylindrical cross section, and a plastic sheathe circumscribing said core intermediate said core and said decorative covering; said sheathe having circumferentially overlapping portions, and a seal extending axially of said core in said sheathe material connecting said overlapping portions.

2. A rug in accordance with claim 1 wherein said thin flexible material comprises cellulose.

3. A rug in accordance with claim 1 wherein the color of said plastic sheathe is the same as the predominant color of said rug.

4. A rug in accordance with claim 1 wherein said thin flexible material comprises a non-woven fabric.

5. A rug in accordance with claim 4 wherein said resilient core also includes at least one sheet of cellulose.

References Cited

UNITED STATES PATENTS

| | | | |
|---|---|---|---|
| 2,698,269 | 12/1954 | Sussenbach | 161—176 |
| 2,164,702 | 7/1939 | Davidson | 93—1 |
| 2,628,464 | 2/1953 | Plata et al. | 156—383 XR |
| 2,748,448 | 6/1956 | Menzies | 161—35 XR |
| 2,963,716 | 12/1960 | Norehad | 161—107 XR |
| 3,054,707 | 9/1962 | Logrippo | 161—35 XR |
| 3,067,804 | 12/1962 | Magner | 156—461 |

ROBERT F. BURNETT, Primary Examiner

W. A. POWELL, Assistant Examiner

U.S. Cl. X.R.

87—7; 156—148, 201, 204, 213, 215, 227, 306, 465; 161—107, 175, 180